J. B. WIARD.
CENTRIFUGAL CLUTCH.
APPLICATION FILED JUNE 30, 1910.
1,032,524.
Patented July 16, 1912.
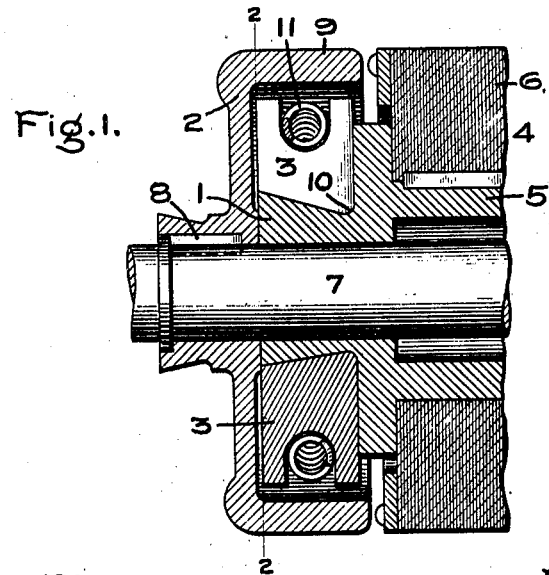
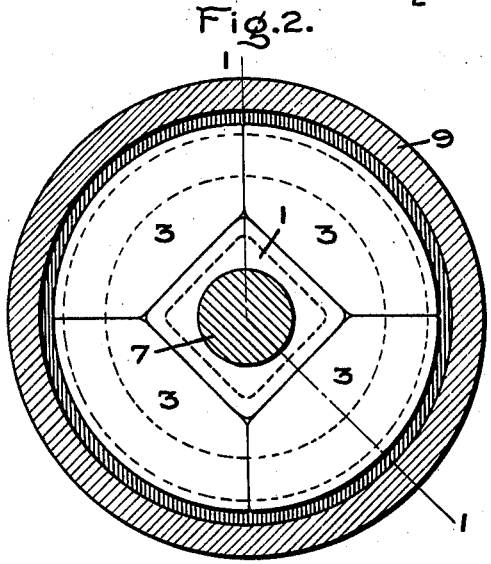 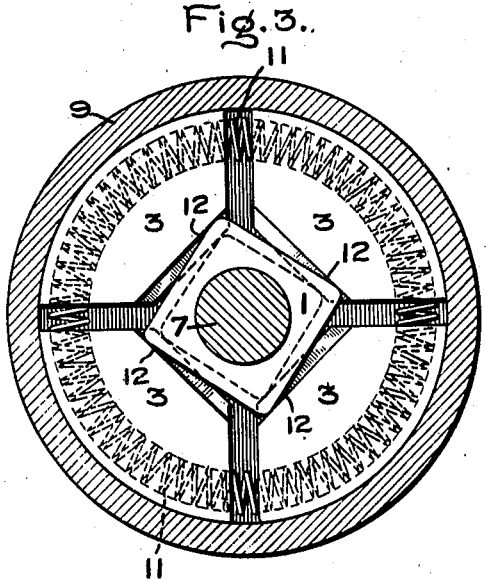
Witnesses:
Marcus L. Byng.
Earl Ryan
Inventor
John B. Wiard,
by Albert G. Davis
His Attorney.

UNITED STATES PATENT OFFICE.

JOHN B. WIARD, OF LYNN, MASSACHUSETTS, ASSIGNOR TO GENERAL ELECTRIC COMPANY, A CORPORATION OF NEW YORK.

CENTRIFUGAL CLUTCH.

1,032,524.  Specification of Letters Patent.  Patented July 16, 1912.

Application filed June 30, 1910. Serial No. 569,744.

*To all whom it may concern:*

Be it known that I, JOHN B. WIARD, a citizen of the United States, residing at Lynn, in the county of Essex, State of Massachusetts, have invented certain new and useful Improvements in Centrifugal Clutches, of which the following is a specification.

My invention relates to centrifugal clutches and has for its object a novel arrangement and construction of parts.

My centrifugal clutch is particularly applicable for coupling an electric motor having a small starting torque, such as a single-phase induction motor, to a machine which is to be driven.

Heretofore, centrifugal clutches have been made with a plurality of clutch members arranged to be thrown outwardly by centrifugal force to engage the driven member, these clutch members being driven by pins or the like from the driving member. Since in such a case the clutching effect varies with the speed of the driving member, there will be a tendency on the part of the driven member to slip when it becomes heavily loaded. By my invention I arrange the driving member so as to positively lock the clutch members to the driven member when the clutch members have been thrown outwardly and engage the driven member.

Other features of novelty which characterize my invention are pointed out with particularity in the claims annexed to and forming a part of this specification.

For a better understanding of my invention, however, and the advantages possessed by it, reference may be had to the following description taken in connection with the accompanying drawing, in which—

Figure 1 is a sectional view of my clutch taken on the line 1—1 of Fig. 2; Fig. 2 is a sectional view on the line 2—2 of Fig. 1, and Fig. 3 is a view similar to Fig. 2 with the parts in the clutching position.

My invention, as illustrated, comprises a driving member 1, a driven member 2, and a plurality of clutch members 3 arranged to be thrown outwardly by centrifugal force to engage the driven member, the driving member 1 being arranged so as to engage the clutch members 3 to positively lock them to the driven member 2 when the clutch members have been thrown outwardly to engage the driven member.

I have shown my centrifugal clutch arranged to connect an armature 4 of a single-phase induction motor to the shaft on which it is mounted. This is one of the uses to which it is particularly applicable. The driving member 1 is shown as being made integral with a flange 5 which supports the laminations 6 of the armature 4. This driving member is loosely journaled on a shaft 7. The driven member 2 is fastened to the shaft 7 by means of a key 8, and has a flange 9 surrounding the clutch member 3. The clutch members form a figure, the normal diameter of which is slightly less than the internal diameter of the flange 9. They fit in a recess 10 in the driving member and are held therein by any suitable yielding means such as the spring 11 until the driving member 1 has attained speed. As clearly seen in Figs. 2 and 3, the driving member 1 is polygonal and preferably rectangular in cross-section for the purpose hereinafter set forth.

When the armature 4 begins to rotate, it carries with it the driving member 1 and the clutch members 3 until the armature has attained nearly its full speed, when the clutch members 3 are thrown outwardly by centrifugal force overcoming the tension of the spring 11. These clutch members will now grip the flange 9 of the driven member 2 and will rotate the driven member together with the shaft 7. The flying away of the clutch members from the driving member allows the driving member to turn relatively to them and thus the corners of the driving member engage the interior surfaces 12 of the clutch members and positively lock them to the flange 9 of the driven member. When the power is thrown off the motor, the driving member ceases to drive and slows down, its pressure against the clutch members is released, and since the centrifugal force is not sufficient to hold the clutch members in contact with the flange 9, the spring 11 forces them back in the recess 10 and the shaft is unclutched from the armature.

I desire it to be understood that my invention is not limited to the particular construction shown and described, and I aim in the appended claims to cover all modifications which do not depart from the spirit of my invention.

What I claim as new, and desire to secure by Letters Patent of the United States, is,—

1. In a centrifugal clutch, a driving member, a flanged member to be driven thereby, a plurality of clutch members arranged to be thrown outwardly by centrifugal force to engage said flange, and yielding means for holding said clutch member out of engagement with said flange until said driving member has attained speed, said driving member being arranged so as to engage said clutch members to positively lock them to the flange when said clutch members have been thrown outwardly to engage said flange.

2. In a centrifugal clutch, a polygonal driving member, a flanged member to be driven thereby, a plurality of clutch members arranged to be thrown outwardly by centrifugal force to engage said flange, and yielding means for holding said clutch members out of engagement with said flange until said driving member has attained speed, said driving member engaging the interior surfaces of said clutch members for positively locking them to the flange when said clutch members have been thrown outwardly to engage said flange.

3. In a centrifugal clutch, a polygonal driving member having a recess, a flanged member to be driven thereby, a plurality of clutch members fitting in said recess and arranged to be thrown outwardly by centrifugal force to engage the flange, and yielding means for holding said clutch members out of engagement with said flange until said driving member has attained speed, said driving member engaging the interior surface of said clutch members for positively locking them to the flange when said clutch members have been thrown outwardly to engage said flange.

4. In a centrifugal clutch, a polygonal driving member, a flanged member to be driven thereby, a plurality of clutch members having interior surfaces corresponding to the surfaces of the polygonal driving member and arranged to be thrown outwardly by centrifugal force to engage said flange, and yielding means for holding said clutch members out of engagement with said flange until said driving member has attained speed, said driving member engaging said interior surfaces of said clutch members for positively locking them to the flange when said clutch members have been thrown outwardly to engage said flange.

In witness whereof, I have hereunto set my hand this twenty eighth day of June, 1910.

JOHN B. WIARD.

Witnesses:
 JOHN A. MCMANUS, Jr.,
 CHARLES A. BARNARD.